US006970141B2

(12) United States Patent
Copeland et al.

(10) Patent No.: US 6,970,141 B2
(45) Date of Patent: Nov. 29, 2005

(54) PHASE COMPENSATED FIELD-CANCELLING NESTED LOOP ANTENNA

(75) Inventors: Richard L. Copeland, Boynton Beach, FL (US); Gary Mark Shafer, Boca Raton, FL (US)

(73) Assignee: Sensormatic Electronics Corporation, Boca Raton, FL (US)

( * ) Notice: Subject to any disclaimer, the term of this patent is extended or adjusted under 35 U.S.C. 154(b) by 11 days.

(21) Appl. No.: 10/612,749

(22) Filed: Jul. 2, 2003

(65) Prior Publication Data

US 2005/0001779 A1    Jan. 6, 2005

(51) Int. Cl.[7] .............................................. H01Q 7/00
(52) U.S. Cl. ....................... 343/866; 343/742; 343/867; 340/572.7
(58) Field of Search ............................... 343/741, 742, 343/866, 867; 340/572.7

(56) References Cited

U.S. PATENT DOCUMENTS

| | | | |
|---|---|---|---|
| 4,326,198 A * | 4/1982 | Novikoff | 340/572.2 |
| 5,051,726 A | 9/1991 | Copeland et al. | 340/572 |
| 5,218,371 A | 6/1993 | Copeland et al. | 343/742 |
| 5,321,412 A | 6/1994 | Kopp et al. | 343/742 |
| 5,602,556 A | 2/1997 | Bowers | 343/742 |
| 5,825,291 A * | 10/1998 | Platt et al. | 340/572.7 |
| 5,826,178 A * | 10/1998 | Owen | 455/193.1 |
| 6,025,813 A * | 2/2000 | Hately et al. | 343/867 |
| 6,567,050 B1 * | 5/2003 | Briggs | 343/741 |
| 6,597,318 B1 * | 7/2003 | Parsche et al. | 343/700 MS |
| 6,720,926 B2 * | 4/2004 | Killen et al. | 343/700 MS |
| 6,731,246 B2 * | 5/2004 | Parsche et al. | 343/741 |

* cited by examiner

*Primary Examiner*—Tan Ho

(57) ABSTRACT

A phase compensated loop antenna having phase compensation elements distributed along the length thereof. The phase compensation elements compensate for current variations along the antenna length resulting from increasing the length of the antenna. A nested loop configuration incorporating at least one phase compensated loop antenna is also provided.

46 Claims, 3 Drawing Sheets

PHASE COMPENSATED FIELD-CANCELLING NESTED LOOP ANTENNA

FIELD OF THE INVENTION

The present invention relates to loop antennas, and, in particular, to phase compensated loop antennas that may be utilized in a variety of systems, such as electronic article surveillance (EAS) and radio frequency identification (RFID) systems.

BACKGROUND OF THE INVENTION

A loop antenna may be utilized in a variety of systems, including, for example, EAS and RFID systems. An excitation source may provide current to, or induce current in, the loop antenna at a particular excitation frequency. The excitation source may include a tuning capacitor, where the value of the capacitor is used to set the excitation frequency. Current flowing along the length of the loop antenna generates an electromagnetic field in proportion to the current flow. If the current flow through the antenna exhibits wide variances, then the resulting electromagnetic field will exhibit corresponding variances. This leads to degradation in performance of systems utilizing such antennas.

To avoid this degradation, conventional loop antennas have been constructed to be "electrically small." An electrically small loop antenna is an antenna wherein its physical length is short relative to its operating wavelength, i.e. typically not more than $1/10^{th}$ of the wavelength. The operating wavelength $\lambda$ of the field generated by the antenna in free space is given equation (1), where c is the speed of light, and f is equal to the excitation frequency provided by the excitation source.

$$\lambda = c/f \quad (1)$$

As the physical length of the loop antenna becomes greater than $1/10^{th}$ of the wavelength $\lambda$, appreciable current variances are manifested along the length of the loop.6 Simulations and tests on prototype antennas of differing lengths have been conducted to determine the extent of current variance along the length of loop antennas. For a wavelength of 22.12 meters, corresponding to an excitation frequency of 13.56 MHz, loop antennas having lengths of 2.0 meters, 4.0 meters, and 8.0 meters have been tested. In general, the current variation along the length of the antenna increased substantially as the length of the loop antenna was increased beyond $1/10^{th}$ of the wavelength.

For instance, for a loop antenna length of 2.0 meters, a 0.5 m×0.5 m square loop antenna operating at an excitation frequency of 13.56 MHz was simulated and tested. Of course, the 2.0 meter length is slightly less than $1/10$th of the 22.12 meter wavelength. The simulation was performed using the Expert MININEC Series by EM Scientific, Inc. The Expert MININEC Series is a software tool that utilizes method of moments to solve for currents and electromagnetic fields for electrically thin wires. The simulation revealed that the current around the 2.0 meter loop antenna increased to a maximum level of only about 4% higher than a minimum level. An experimental measurement of the a prototype 0.5 m×0.5 m loop antenna using a Pearson RF current probe also indicated a 4% variation of current magnitude around the loop antenna.

For the longer loop antenna of 4.0 meters, a 1.0 m×1.0 m square loop antenna at 13.56 MHz was simulated using the Expert MININEC Series program. The 4.0 meter length is almost $1/5^{th}$ of the 22.12 meter wavelength. The simulation revealed a current magnitude variation of about 17% comparing a maximum current level to a minimum current level around the loop antenna. An experimental measurement of a prototype 1.0 m×1.0 m loop antenna using a Pearson RF current probe indicated a 30% variation of current magnitude around the loop antenna.

Yet an even longer loop antenna of 8.0 meters, configured as a 2.0 m×2.0 m square loop antenna at 13.56 MHz, was simulated using the Expert MININEC Series program. The 8.0 meter length is almost $2/5^{th}$ of the 22.12 meter wavelength. The simulation revealed a current magnitude variation of as much as 235% comparing a maximum current level to a minimum current level around the antenna. Whenever such large asymmetries exist in the antenna current distribution, as indicated by both the simulated and experimental results, the resulting electromagnetic fields are also asymmetrical. Again, this leads to degradation in performance of systems utilizing such antennas, and in particular is highly undesirable for field-canceling antennas which rely on even field distribution for canceling affects.

It is clear, therefore, that increasing the loop length of conventional antennas to degree appreciably greater than $1/10^{th}$ of the operating wavelength causes increasingly larger current variations around the antenna. These current variations lead to degradation in performance of systems utilizing such antennas. In systems wherein the excitation frequency is fixed, e.g. in some EAS and RFID systems, current variations associated with exceeding an antenna length of $1/10^{th}$ of the operating wavelength place a practical limit on the physical length of the loop antenna. Limited antenna length limits the effective range of such antennas. Also, where such antennas are provided in nested configurations to achieve far-field canceling benefits, the length of the inner loop antenna is constrained by the limited length of the outer loop antenna. As such, the range of an inner loop antenna in a nested loop configuration is also limited.

Accordingly, there is a need in the art for a loop antenna configuration wherein the antenna length may be greater than $1/10^{th}$ of the operating wavelength without causing unacceptable current variance about the antenna length.

SUMMARY OF THE INVENTION

A phase compensated loop antenna consistent with the invention includes a conductor configured in a loop of one or more turns, and at least one phase compensation element coupled along a length of the conductor. The phase compensation element compensates for current variations along the conductor. An EAS system incorporating a phase compensated loop is also provided.

According to another aspect of the invention, there is provided a nested loop antenna system including a first antenna including a first conductor having a first length configured in a first loop of at least one turn, and a second antenna including a second conductor having a second length configured in a second loop of at least one turn. The second loop is disposed within the first loop to provide a nested configuration. At least one phase compensation element is coupled along at least one of the first length of the first conductor and the second length of the second conductor. An EAS system incorporating a nested loop system is also provided.

According to a further aspect of the invention, there is provided a method of reducing current variation along a length of a loop antenna including: providing an excitation current to the loop antenna; and controlling the excitation current along the length of the loop antenna by providing at least one phase compensation element along the length of the loop antenna.

BRIEF DESCRIPTION OF THE DRAWINGS

For a better understanding of the present invention, together with other objects, features and advantages, reference should be made to the following detailed description which should be read in conjunction with the following figures wherein like numerals represent like parts.

DETAILED DESCRIPTION

The present invention will be described herein in connection with various exemplary embodiments thereof associated with EAS systems. The present invention may, however, be incorporated into a wide variety of loop antenna systems and configurations. For example, the invention has utility in connection with RFID systems. Those skilled in the art will recognize that an RFID system utilizes RFID markers or tags to track articles for various purposes such as inventory. The RFID marker may store data associated with the article, and an RFID reader may scan the RFID marker to read the data by transmitting an interrogation signal at a known frequency. The RFID reader may contain a phase compensated loop antenna consistent with the invention. In fact, the present invention may be advantageously employed, without departing from the spirit and scope of the invention, in any loop antenna system wherein it is useful or desired to reduce current variation along the length of the loop. It is to be understood, therefore, that the embodiments described herein are presented by way of illustration, not of limitation.

Figure 1:
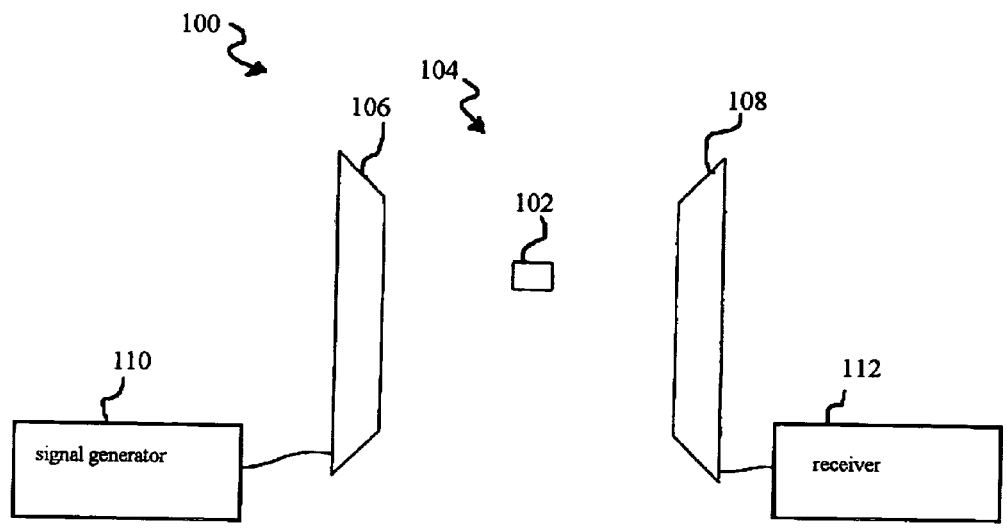
FIG. 1 is block diagram of an exemplary EAS system consistent with the invention.

Turning now to FIG. 1, there is illustrated, in highly-simplified block diagram form, an exemplary EAS system 100 including a phase compensated loop antenna consistent with the invention. A variety of EAS system configurations will be known to those skilled in the art. The illustrated exemplary EAS system 100 generally includes a pair of antenna pedestals 106, 108 that define an interrogation zone 104 for detection of a marker 102 within the interrogation zone 104.

In general, the pedestals may be placed at the exit of a protected area, e.g. a retail outlet, rental location, library, etc., for detecting active markers affixed to various items. Active markers may be affixed to items and either removed or deactivated when it is determined that the item may leave the protected area, e.g. when the item is properly purchased or rented. If an active marker is passed through the interrogation zone, it is detected by the system and an alarm may be activated to indicate that the item is being removed from the protected area without authorization.

The antenna pedestals 106, 108 may be generally planar and may include one or more phase compensated loop antennas, as further detailed herein. A signal generator 110 may be coupled to the antenna pedestal 106 to drive the antenna or antennas in the pedestal 106 for establishing an interrogation signal in the interrogation zone 104. Receiver circuitry 112 may be coupled to one 108 or both of the antenna pedestals to receive and analyze signals from the interrogation zone. For ease of explanation, the signal generator 110 is coupled to an antenna or antennas in the pedestal 106 to transmit the interrogation signal and the receiver circuitry 112 is coupled to a receiver antenna in the pedestal 108. Those skilled in the art will recognize that the signal generator and receiver circuitry may be combined, and that one or more antennas may be configured to act as a transceiver antenna.

The marker 102 may include a coil or other planar element that receives the interrogation signal generated by the antenna pedestal 106 and establishes, in some fashion, a marker signal to be detected by the receiver circuitry in the pedestal 108. A variety of EAS marker types, e.g. magneto-mechanical, acusto-mechanical, coil-type, etc. are known to those skilled in the art. Magneto-mechanical and acusto-mechanical EAS markers generally respond to flux that is co-planar with the marker. Markers that include a coil generally respond to flux that is orthogonal to the plane of the antenna.

The signal generator 110 together may energize the transmitter antenna in pedestal 106 through a resonant circuit tuned to the excitation frequency. The loop antenna may be modeled as an inductive element and resistive element in series. A resonant capacitor may be chosen to establish a resonant circuit in combination with the inductive and resistive elements tuned to resonate at the desired excitation frequency. Consistent with the present invention, all or a portion of the resonant circuit capacitance may be advantageously distributed along the length of the loop antenna, thereby minimizing current variation along the antenna length.

Figure 2A:
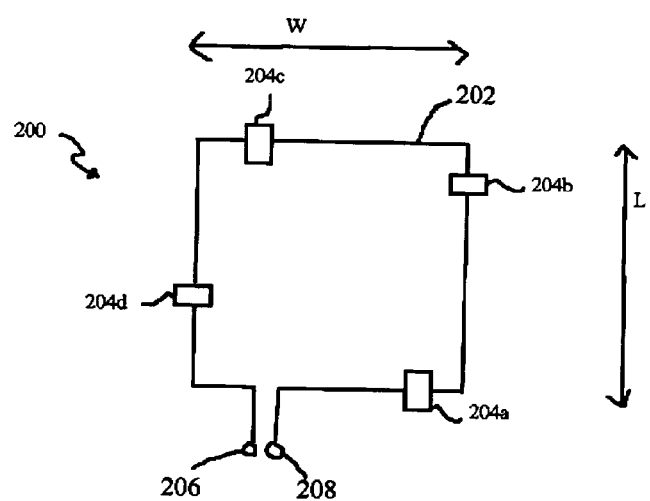
FIG. 2A is an exemplary phase compensated loop antenna consistent with the invention.

FIG. 2A, for example, illustrates a phase compensated loop antenna 200 consistent with the invention. The illustrated exemplary antenna 200 includes a conductor 202, e.g. a ferrous material, having one or more turns arranged in a loop whereby first 206 and second 208 ends of the conductor 202 are disposed adjacent to one another for connection to the transmitter circuitry. The exemplary antenna 200 is configured a parallelogram, having first and second opposing sides of length W and third and forth opposing sides of length H. In one embodiment, the antenna 200 may be generally square with a width W and height H of 2 m, and may be configured for operating at 13.56 MHz. It is to be understood, however, that the present invention is applicable to loop antennas provided in a variety of regular and irregular geometrical configurations, and is not limited to parallelogram configurations.

Advantageously, the antenna 200 includes a number of phase compensation elements 204a, 204b, 204c, and 204d distributed between the first 206 and second ends 208 along the length of the conductor 202. In one embodiment, the phase compensation elements may be spaced equidistantly about the length of the conductor. It is to be understood, however, that an antenna consistent with the present invention may include phase compensation elements in equidistant or non-equidistant spacing along the length of the conductor. The phase compensation elements 204a, 204b, 204c, and 204d may be any of a variety of elements, or combinations of elements, known in the art as providing phase compensation. In the exemplary embodiment 200, for example, the phase compensation elements may be discrete capacitors.

Of course, the total capacitance and/or inductance of the phase compensation elements affects the antenna resonant circuit and should be considered when configuring the resonant circuit for resonance at the desired excitation frequency. In one embodiment, the total resonant circuit capacitance may be embodied in one or more phase compensation elements distributed along the antenna length. In another embodiment, a discrete capacitor may be provided, e.g. at the input terminals, with the resonant capacitance being established by the combined capacitance of one or more phase compensation elements distributed along the antenna length and the discrete capacitor. Other combinations for establishing an antenna resonant circuit with phase compensation elements distributed along the length of the antenna will be known to those skilled in the art.

The total number of phase compensation elements distributed along the antenna length may be selected to reduce the current variance level for a system of interest to an acceptable level. Total system cost may also be a concern. As such, it may be desirable to achieve an acceptable level of current variance with a minimum number of phase compensation elements. Depending on the length of the loop antenna, the operation frequency, the desired current variance level, and cost and other considerations, a particular system may require only one phase compensation element, whereas other systems may require two or more phase compensation elements.

Figure 2B:
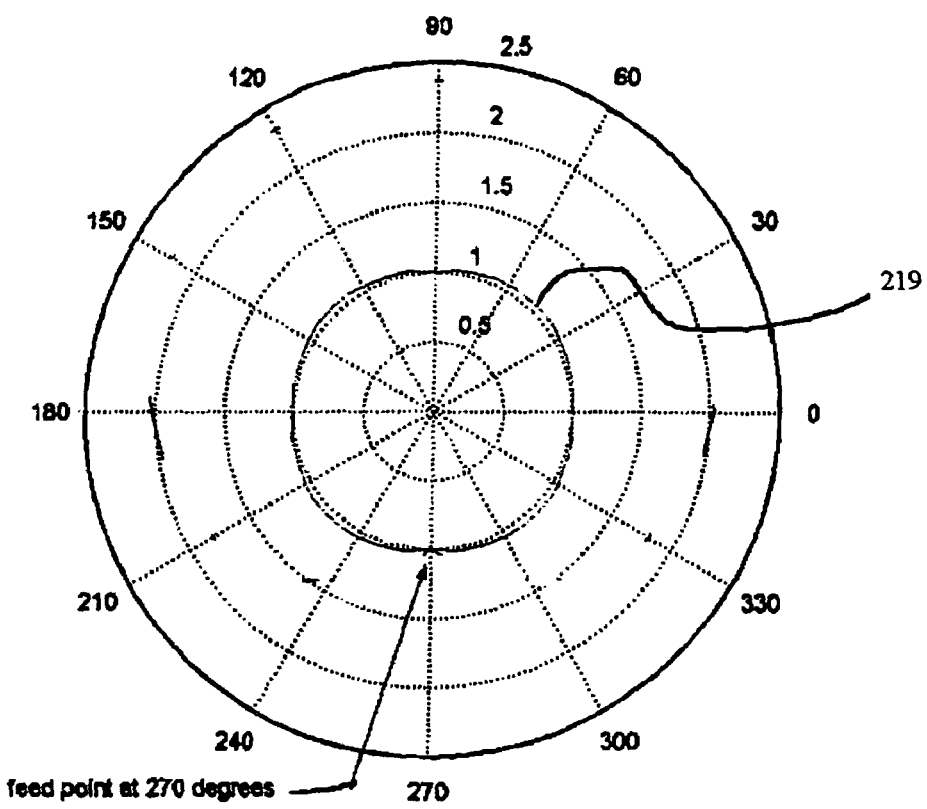
FIG. 2B is an exemplary polar plot illustrating current variation along a length of a phase compensated loop antenna consistent with the invention.

Turning to FIG. 2B, a simulated plot 219 using the Expert MININEC Series program and a method of moments calculation is illustrated for the phase compensated loop 200 of FIG. 2A, wherein the loop includes width W and height H dimensions of 2 m and is configured for operating at a resonant/excitation frequency of 13.56 MHz. The phase compensation elements 204a, 204b, 204c, and 204d were modeled as capacitors wherein the total capacitance of the phase compensation elements established the total capacitance of the resonant circuit. Advantageously, the addition of the four discrete phase compensation elements, spaced equidistantly along the antenna length reduced the current variation around the loop antenna to only 4% variation when comparing a maximum current level to a minimum current level. In contrast, a similar size (2.0 m×2.0 m) loop antenna at a similar excitation frequency of 13.56 MHz without any phase compensation elements resulted in a maximum current level 235% higher than a minimum current level as previously detailed. The resulting electromagnetic field from such phase compensated loop antenna 200 is much more uniform than a similar sized uncompensated antenna.

A phase compensated loop antenna consistent with the invention may be advantageously employed in a nested loop antenna system for far-field canceling applications. Those skilled in the art will recognize that nested loop antenna configurations may be utilized in a variety of systems such as an EAS or RFID system. For example, it is advantageous for EAS and other systems to provide a strong uniform electromagnetic field in an interrogation zone, while providing for reduced field levels outside of the interrogation zone. Reduced field levels outside the interrogation zone may be necessary to comply with regulatory constraints on acceptable field levels at various distances from the antenna. Nested loop antennas may be configured to achieving the necessary far-field canceling required in such systems.

Figure 3:
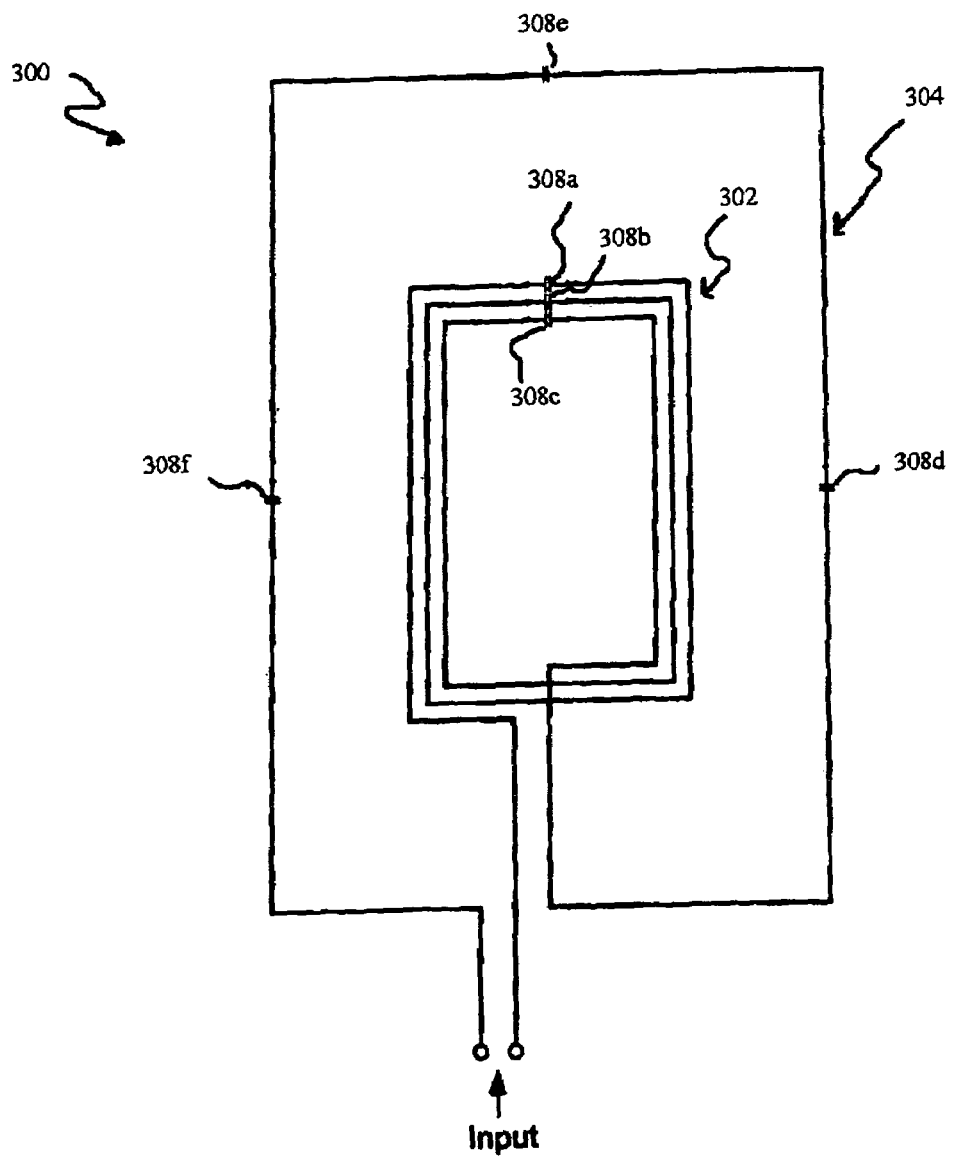
FIG. 3 is an exemplary nested loop antenna system utilizing at least one phase compensated loop antenna consistent with the invention.

Turning to FIG. 3, an exemplary nested loop antenna system 300 having a phase compensated loop antenna consistent with the invention is illustrated. The illustrated exemplary nested loop antenna system 300 generally includes an inner loop 302 and outer loop 304 connected in series. One or both of the loops 302, 304 may be a phase compensated loop consistent with the invention. The inner loop 302 and the outer loop 304 may also be concentric and coplanar. The inner loop 302 dominates the resulting near field while the outer loop 304 causes field cancellation at a distant point from the antenna system 300.

Those skilled in the art will recognize that nested loops consistent with the present invention may be provided in a variety of configurations. For example, the inner and outer loops may be separate loops connected in parallel or in series. In addition, it is also possible provide more than two nested loops in various configurations. In the exemplary embodiment of FIG. 3, the outer loop 304 has a dimension of about 70 cm wide by 130 cm high for a total length of about 4 meters. The inner loop 302 has a dimension of about 43 cm wide by 71 cm high for a total length of one turn of 228 cm. The conductors of the two loops 302, 304 are coupled electrically in series.

In order for field cancellation at a far-field distance, the product of the loop area and turns of both inner loop 302 and outer loop 304 should be approximately the same. For instance, in this nested loop antenna system 300 of FIG. 3, the inner loop product is 9159 $cm^2$ ((43 cm×71 cm)*3 turns) while the outer loop product is 9100 $cm^2$ ((70 cm×130 cm)*1 turn.) This geometry minimizes the field at 30 meters from the nested antenna loop with phase compensation.

The inner loop 302 is a three turn loop having phase compensation elements 308a, 308b, 308c disposed along the length of each turn. The outer loop 304 is a single turn having three phase compensation elements 308d, 308e, and 308f disposed equidistantly about the length of the outer loop. In the illustrated embodiment, the phase compensation elements 308a, 308b, 308c in the inner loop and the phase compensation 308d, 308e, and 308f elements in the outer loop are capacitors of equal value.

Phase compensation is particularly useful in a nested loop antenna system since it enables the outer loop, e.g. loop 304, to be longer than it otherwise could be without phase compensation while still exhibiting an acceptable current variance about the length of the outer loop. As such, the resulting magnetic field is sufficiently consistent to result in appropriate field canceling in the far-field, e.g., 30 meters from the antenna system 300. In addition, the inner loop, e.g. loop 302, can be made longer. The inner loop may, therefore, produce a stronger magnetic field in the near field than it otherwise could produce if the outer field canceling loop was not present.

There is thus provided a phase compensated loop antenna, having phase compensation elements distributed along the length thereof. The phase compensation elements compensate for current variations along the antenna length resulting from increasing the length beyond $1/10^{th}$ of the operating wavelength of the antenna, e.g. greater than $2/5^{th}$ of the operating wavelength of the antenna. As such, the antenna may be increased in length to improve antenna detection/transmission range. In a nested loop configuration, phased compensation allows inner and outer loops to be increased in size to increase antenna range while maintaining appropriate far-field canceling effects. In EAS and RFID systems, this allows an increase in the size of the interrogation zone established by the antenna. As such, EAS and RFID systems including phase compensated antennas may be provided at wide-exit locations where the exit from the protected area is physically wider than can be accommodated by non-compensated loop antennas.

The embodiments that have been described herein, however, are but some of the several which utilize this invention and are set forth here by way of illustration but not of limitation. It is obvious that many other embodiments, which will be readily apparent to those skilled in the art, may be made without departing materially from the spirit and scope of the invention as defined in the appended claims.

What is claimed is:

1. A loop antenna comprising:
   a conductor configured in a loop of one or more turns; and
   at least one phase compensation element coupled to said conductor along a length of said conductor to control an excitation current along said length of said conductor such that a maximum excitation current level at a first point along said length of said conductor differs from a minimum excitation current level at a second point along said length of said conductor by less than a predetermined amount.

2. The loop antenna of claim 1, wherein said at least one phase compensation element comprises a capacitor.

3. The loop antenna of claim 2, wherein a total capacitance of said at least one phase compensation element is configured tuning a resonant circuit associated with said antenna to a predetermined excitation frequency.

4. The loop antenna of claim 1, comprising a plurality of said phase compensation elements.

5. The loop antenna of claim 4, wherein said phase compensation elements are equidistantly spaced along said length of said conductor.

6. The loop antenna of claim 1, wherein said predetermined mount is 5%.

7. A nested loop antenna system comprising:
   a first antenna comprising a first conductor having a first length configured in a first loop of at least one turn, and a second antenna comprising a second conductor having a second length configured in a second loop of at least one turn, said second loop being disposed within said first loop; and
   at least one phase compensation element coupled along at least one of said first length of said first conductor and said second length of said second conductor to control an excitation current along said at least one of said first length of said first conductor and said second length of said second conductor such that a maximum excitation current level at a first point differs from a minimum excitation current level at a second point along said at least one of said first length of said first conductor and said second length of said second conductor by less than a predetermined amount.

8. The nested loop antenna system of claim 7, wherein a plurality of said phase compensation elements are spaced equidistantly along said first conductor.

9. The nested loop antenna system of claim 7, wherein said first loop is configured for excitation by an excitation source at a predetermined excitation frequency, said predetermined excitation frequency having an associated wavelength in free space, and wherein said first length of said first loop is greater than $1/10^{th}$ of said wavelength.

10. The nested loop antenna system of claim 9, wherein said first length of said first loop is greater than $1/5^{th}$ of said wavelength.

11. The nested loop antenna system of claim 9, wherein said first length of said first loop is greater than $2/5^{th}$ of said wavelength.

12. The nested loop antenna system of claim 9, wherein said second length of said second loop is greater than $1/10^{th}$ of said wavelength.

13. The nested loop antenna system of claim 7, wherein said first and second conductors comprise the same material.

14. The nested loop antenna system of claim 7, wherein said first and second conductors are connected in series.

15. The nested loop antenna system of claim 7, wherein said first and second loops are generally rectangular.

16. The nested loop antenna system of claim 7, wherein said at least one phase compensation element comprises a capacitor.

17. The nest loop antenna system of claim 7, wherein said predetermined amount is 5%.

18. A nested loop antenna system comprising:
   a first antenna comprising a first conductor having a first length configured in a first loop of at least one turn, and a second antenna comprising a second conductor having a second length configured in a second loop of at least one turn, said second loop being disposed within said first loop; and
   at least one phase compensation element coupled along at least one of said first length of said first conductor and said second length of said second conductor, wherein a first plurality of said phase compensation elements are disposed along said first conductor, and a second plurality of said phase compensation elements are disposed along said second conductor.

19. The nested loop antenna system of claim 18, wherein at least one of said first and second plurality of said phase compensation elements comprises a discrete capacitor.

20. A nested loop antenna system comprising:
   a first antenna comprising a first conductor having a first length configured in a first loop of at least one turn, and a second antenna comprising a second conductor having a second length configured in a second loop of at least one turn, said second loop being disposed within said first loop; and
   at least one phase compensation element coupled along at least one of said first length of said first conductor and said second length of said second conductor, wherein a plurality of said phase compensation elements are spaced equidistanily along said second conductor.

21. A nested loop antenna system comprising:
   a first antenna comprising a first conductor having a first length configured in a first loop of at least one turn, and a second antenna comprising a second conductor having a second length configured in a second loop of at least one turn, said second loop being disposed within said first loop; and
   at least one phase compensation element coupled along at least one of said first length of said first conductor and said second length of said second conductor, wherein first; second and third ones of phase compensation elements are spaced equidistantly along said second conductor.

22. A nested loop antenna system comprising:
   a first antenna comprising a first conductor having a first length configured in a first loop of at least one turn, and a second antenna comprising a second conductor having a second length configured in a second loop of at least one turn, said second loop being disposed within said first loop; and
   at least one phase compensation element coupled along at least one of said first length of said first conductor and said second length of said second conductor, wherein first, second and third ones of said phase compensation elements are spaced equidistantly along said first conductor.

23. A nested loop antenna system comprising:
   a first antenna comprising a first conductor having a first length configured in a first loop of at least one turn, and a second antenna comprising a second conductor having a second length configured in a second loop of at least one turn, said second loop being disposed within said first loop; and at least one phase compensation element coupled along at least one of said first length of said first conductor and said second length of said second conductor, wherein said first loop is configured for excitation by an excitation source at a predetermined excitation frequency, said predetermined excitation frequency having an associated wavelength in free space, and wherein said first length of said first loop is greater than $\frac{1}{10}^{th}$ of said wavelength, and wherein said excitation frequency is 8.2 MHz, said wavelength is 36.6 meters, and said second length is greater than 6.1 meters.

24. A nested loop antenna system comprising;

a first antenna comprising a first conductor having a first length configured in a first loop of at least one turn, and a second antenna comprising a second conductor having a second length configured in a second loop of at least one turn, said second loop being disposed within said first loop; and at least one phase compensation element coupled along at least one of said first length of said first conductor and said second length of said second conductor, wherein said first loop is configured for excitation by an excitation source at a predetermined excitation frequency, said predetermined excitation frequency having an associated wavelength in free space, and wherein said first length of said first loop is greater than $\frac{1}{10}^{th}$ of said wavelength, and wherein said excitation frequency is 13.56 MHz, said wavelength is 22.12 meters, and said second length is greater than or equal to 4 meters.

25. A method of reducing current variation along a length of a loop antenna, said method comprising:

providing an excitation current to said loop antenna; and controlling said excitation current along said length of said loop antenna by providing at least one phase compensation element along said length of said loop antenna, wherein said controlling said excitation current comprises controlling said excitation current along said length of said loop antenna such that a maximum excitation current level at a first point along said length of said loop antenna differs from a minimum excitation current level at a second point along said length of said loop antenna by less than a predetermined amount.

26. The method of claim 25, wherein said predetermined amount is 5%.

27. An electronic article surveillance (EAS) system comprising:

a first antenna; and a second antenna spaced from said first antenna to establish an interrogation zone, at least one of said first and second antennas comprising a loop antenna, said loop antenna comprising a conductor configured in a loop of one or more turns and at least one phase compensation element coupled to said conductor along a length of said conductor to control an excitation current along said length of said conductor such that a maximum excitation current level at a first point along said length of said conductor differs from a minimum excitation current level at a second point along said length of said conductor by less than a predetermined amount.

28. The system of claim 27, wherein said at least one phase compensation element comprises a capacitor.

29. The system of claim 27, said system comprising a plurality of said phase compensation elements disposed along said length of said conductor.

30. An electronic article surveillance (EAS) system comprising:

a first antenna; and a second antenna spaced from said first antenna to establish an interrogation zone, at least one of said first and second antennas comprising a first loop antenna comprising a first conductor having a first length configured in a first loop of at least one turn, and a second loop antenna comprising a second conductor having a second length configured in a second loop of at least one turn, said second loop being disposed within said first loop; and at least one phase compensation element coupled along at least one of said first length of said first conductor and said second length of said second conductor to control an excitation current along said at least one of said first length of said first conductor and said second length of said second conductor such that a maximum excitation current level at a first point differs from a minimum excitation current level at a second point along said at least one of said first length of said first conductor and said second length of said second conductor by less than a predetermined amount.

31. The system of claim 30, wherein a plurality of said phase compensation elements are spaced equidistantly along said first conductor.

32. The system of claim 30, wherein said first loop is configured for excitation by an excitation source at a predetermined excitation frequency, said predetrmined excitation frequency having an associated wavelength in free space, and wherein said first length of said first loop is greater than $\frac{1}{10}^{th}$ of said wavelength.

33. The system of claim 32, wherein said first length of said first loop is greater than $\frac{1}{5}^{th}$ of said wavelength.

34. The system of claim 32, wherein said first length of said first loop is greater than $\frac{2}{5}^{th}$ of said wavelength.

35. The system of claim 32, wherein said second length of said second loop is greater than $\frac{1}{10}^{th}$ of said wavelength.

36. The system of claim 30, wherein said first and second conductors comprise the same material.

37. The system of claim 30, wherein said first and second loops are generally rectangular.

38. The system of claim 30, wherein said at least one phase compensation element comprises a capacitor.

39. An electronic article surveillance (EAS) system comprising:

a first antenna; and a second antenna spaced from said first antenna to establish an interrogation zone, at least one of said first and second antennas comprising a first loop antenna comprising a first conductor having a first length configured in a first loop of at least one turn, and a second loop antenna comprising a second conductor having a second length configured in a second loop of at least one turn, said second loop being disposed within said first loop; and at least one phase compensation element coupled along at least one of said first length of said first conductor and said second length of said second conductor, wherein a first plurality of said phase compensation elements are disposed along said first conductor, and a second plurality of said phase compensation elements are disposed along said second conductor.

40. The system of claim 39, wherein at least one of said first and second plurality of said phase compensation elements comprises a discrete capacitor.

41. An electronic article surveillance (EAS) system comprising;
   a first antenna; and
   a second antenna spaced from said first antenna to establish an interrogation zone,
   at least one of said first and second antennas comprising a first loop antenna comprising a first conductor having a first length configured in a first loop of at least one turn, and a second loop antenna comprising a second conductor having a second length configured in a second loop of at least one turn, said second loop being disposed within said first loop; and
   at least one phase compensation element coupled along at least one of said first length of said first conductor and said second length of said second conductor, wherein a plurality of said phase compensation elements are spaced equidistantly along said second conductor.

42. An electronic article surveillance (EAS) system comprising:
   a first antenna; and
   a second antenna spaced from said first antenna to establish an interrogation zone,
   at least one of said first and second antennas comprising a first loop antenna comprising a first conductor having a first length configured in a first loop of at least one turn, and a second loop antenna comprising a second conductor having a second length configured in a second loop of at least one turn, said second loop being disposed within said first loop; and
   at least one phase compensation element coupled along at least one of said first length of said first conductor and said second length of said second conductor, wherein first, second and third ones of said phase compensation elements are spaced equidistantly along said second conductor.

43. An electronic article surveillance (EAS) system comprising:
   a first antenna; and
   a second antenna spaced from said first antenna to establish an interrogation zone,
   at least one of said first and second antennas comprising a first loop antenna comprising a first conductor having a first length configured in a first loop of at least one turn, and a second loop antenna comprising a second conductor having a second length configured in a second loop of at least one turn, said second loop being disposed within said first loop; and
   at least one phase compensation element coupled along at least one of said first length of said first conductor and said second length of said second conductor, wherein first, second and third ones of said phase compensation elements are spaced equidistantly along said first conductor.

44. An electronic article surveillance (EAS) system comprising:
   a first antenna; and
   a second antenna spaced from said first antenna to establish an interrogation zone,
   at least one of said first and second antennas comprising a first loop antenna comprising a first conductor having a first length configured in a first loop of at least one turn, and a second loop antenna comprising a second conductor having a second length configured in a second loop of at least one turn, said second loop being disposed within said first loop; and
   at least one phase compensation element coupled along at least one of said first length of said first conductor and said second length of said second conductor, wherein said first loop is configured for excitation by an excitation source at a predetermined excitation frequency, said predetermined excitation frequency having an associated wavelength in free space, and wherein said first length of said first loop is greater than $\frac{1}{10}^{th}$ of said wavelength, wherein said excitation frequency is 8.2 MHz, said wavelength is 36.6 meters, and said second length is greater than 6.1 meters.

45. An electronic article surveillance (EAS) system comprising:
   a first antenna; and
   a second antenna spaced from said first antenna to establish an interrogation zone,
   at least one of said first and second antennas comprising a first loop antenna comprising a first conductor having a first length configured in a first loop of at least one turn, and a second loop antenna comprising a second conductor having a second length configured in a second loop of at least one turn, said second loop being disposed within said first loop; and
   at least one phase compensation element coupled along at least one of said first length of said first conductor and said second length of said second conductor, wherein said first loop is configured for excitation by an excitation source at a predetermined excitation frequency, said predetermined excitation frequency having an associated wavelength in free space, and wherein said first length of said first loop is greater than $\frac{1}{10}^{th}$ of said wavelength, wherein said excitation frequency is 13.56 MHz, said wavelength is 22.12 meters, and said second length is greater than or equal to 4 meters.

46. An electronic article surveillance (EAS) system comprising:
   a first antenna; and
   a second antenna spaced from said first antenna to establish an interrogation zone,
   at least one of said first and second antennas comprising a first loop antenna comprising a first conductor having a first length configured in a first loop of at least one turn, and a second loop antenna comprising a second conductor having a second length configured in a second loop of at least one turn, said second loop being disposed within said first loop; and
   at least one phase compensation element coupled along at least one of said first length of said first conductor and said second length of said second conductor, wherein said first and second conductors are connected in series.

* * * * *